Figure 5:
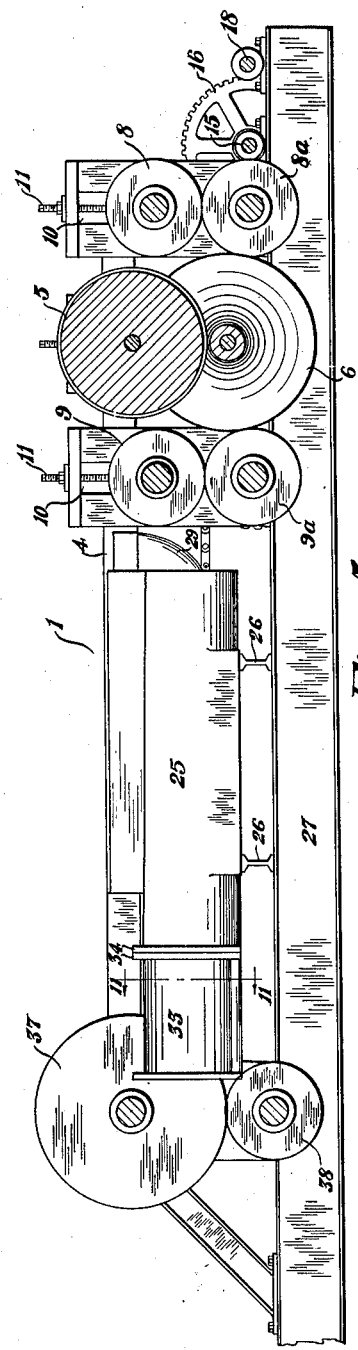

Feb. 11, 1930.  E. W. RIEMENSCHNEIDER  1,746,281
APPARATUS FOR AND METHOD OF MAKING TAPERED TUBULAR POLES
Filed July 26, 1927  9 Sheets-Sheet 1
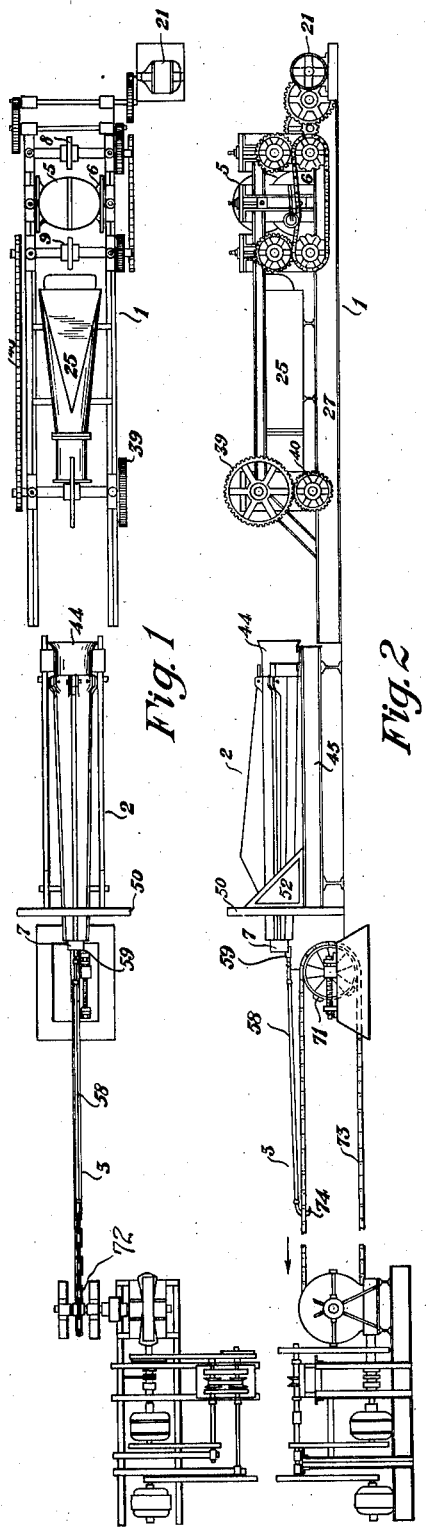
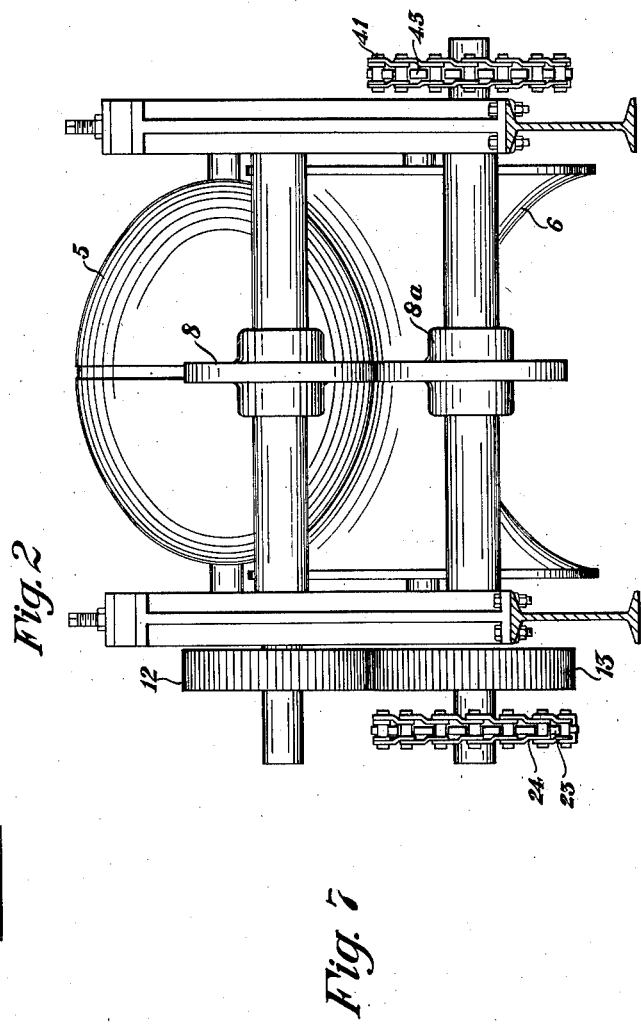
Inventor
E. W. Riemenschneider
By Freas and Bond Attorney Feb. 11, 1930.  E. W. RIEMENSCHNEIDER  1,746,281
APPARATUS FOR AND METHOD OF MAKING TAPERED TUBULAR POLES
Filed July 26, 1927  9 Sheets-Sheet 2
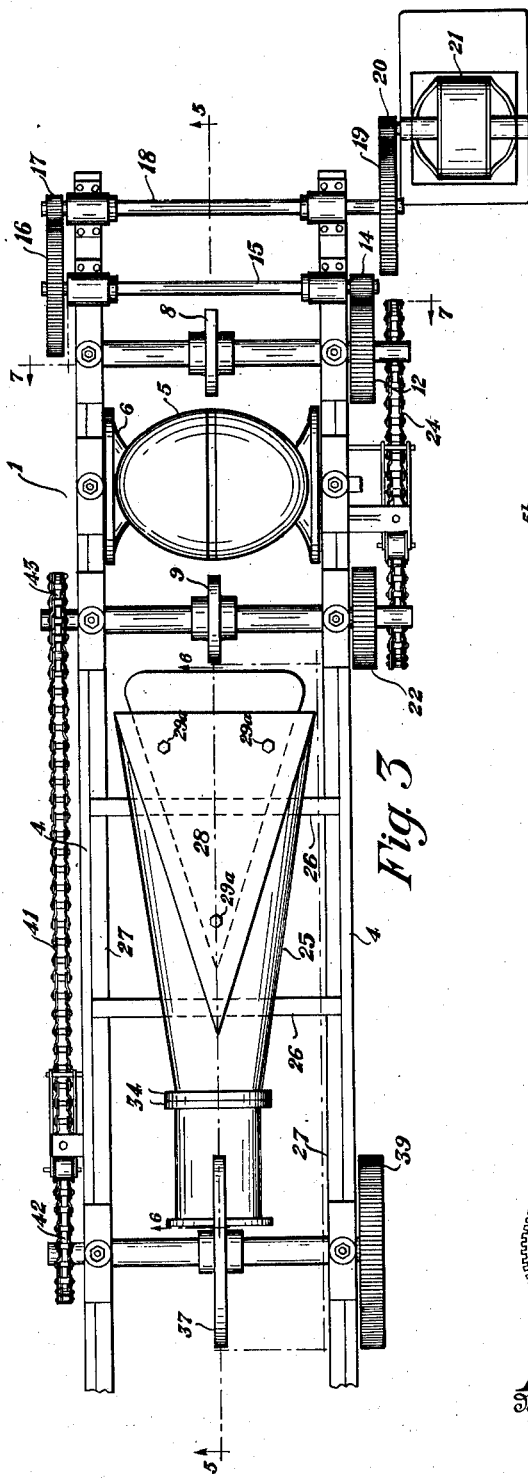
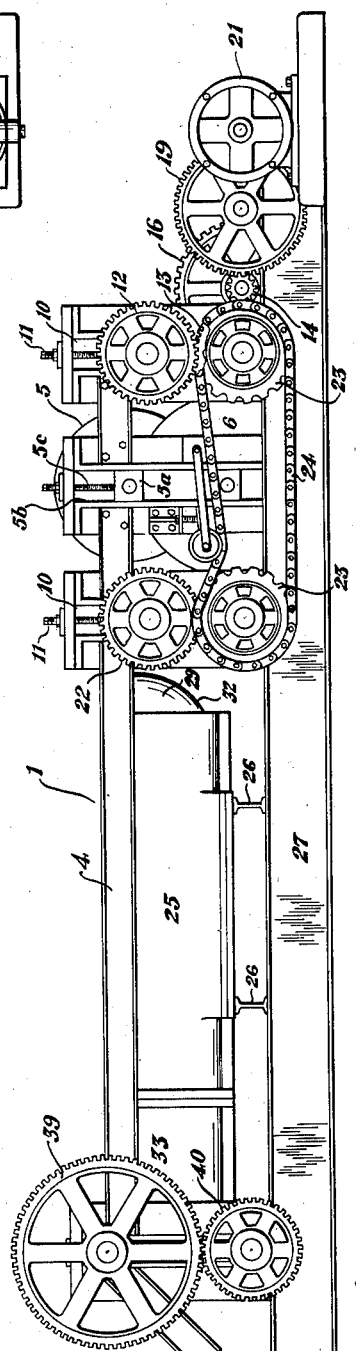
Inventor
E. W. Riemenschneider
By Freas and Bond Attorneys Feb. 11, 1930. E. W. RIEMENSCHNEIDER 1,746,281
APPARATUS FOR AND METHOD OF MAKING TAPERED TUBULAR POLES
Filed July 26, 1927 9 Sheets-Sheet 3

Inventor
E. W. Riemenschneider
By Frease and Bond Attorneys

Feb. 11, 1930.  E. W. RIEMENSCHNEIDER  1,746,281
APPARATUS FOR AND METHOD OF MAKING TAPERED TUBULAR POLES
Filed July 26, 1927  9 Sheets-Sheet 4
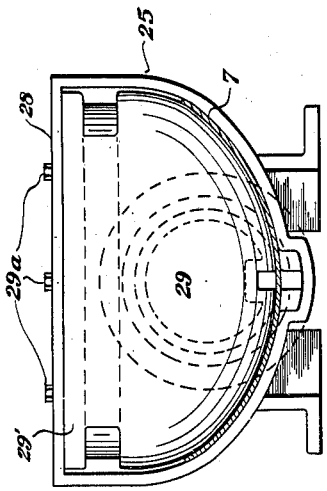
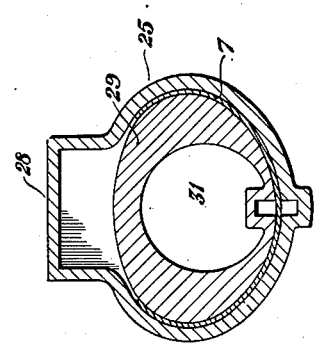
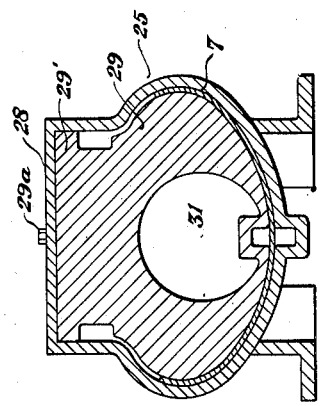
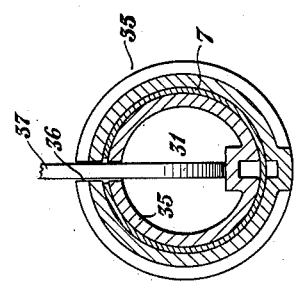
Inventor
E. W. Riemenschneider
By
Frease and Bond  Attorneys Inventor E. W. Riemenschneider By Frease and Bond Attorney

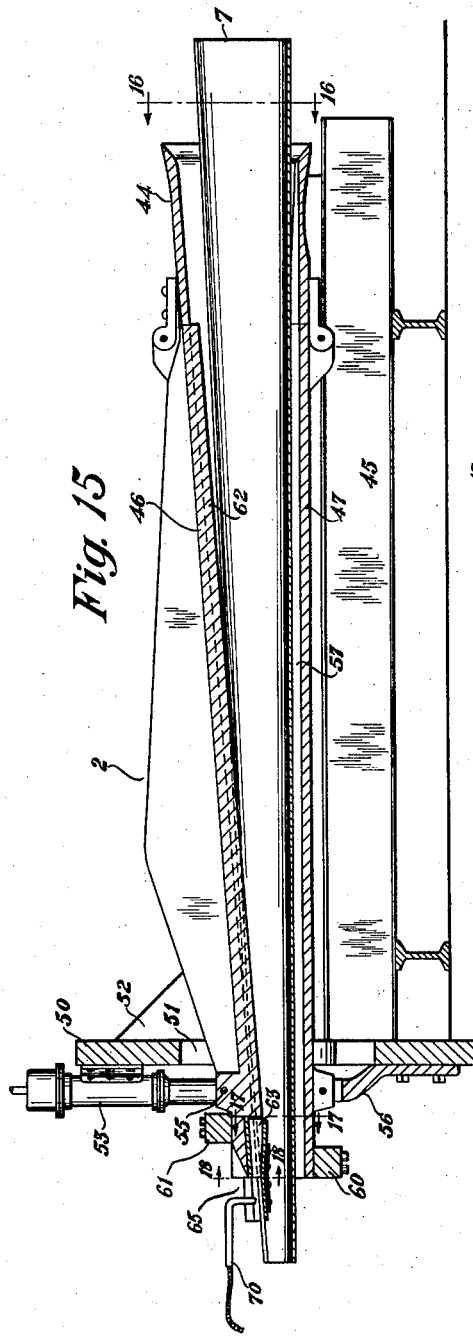

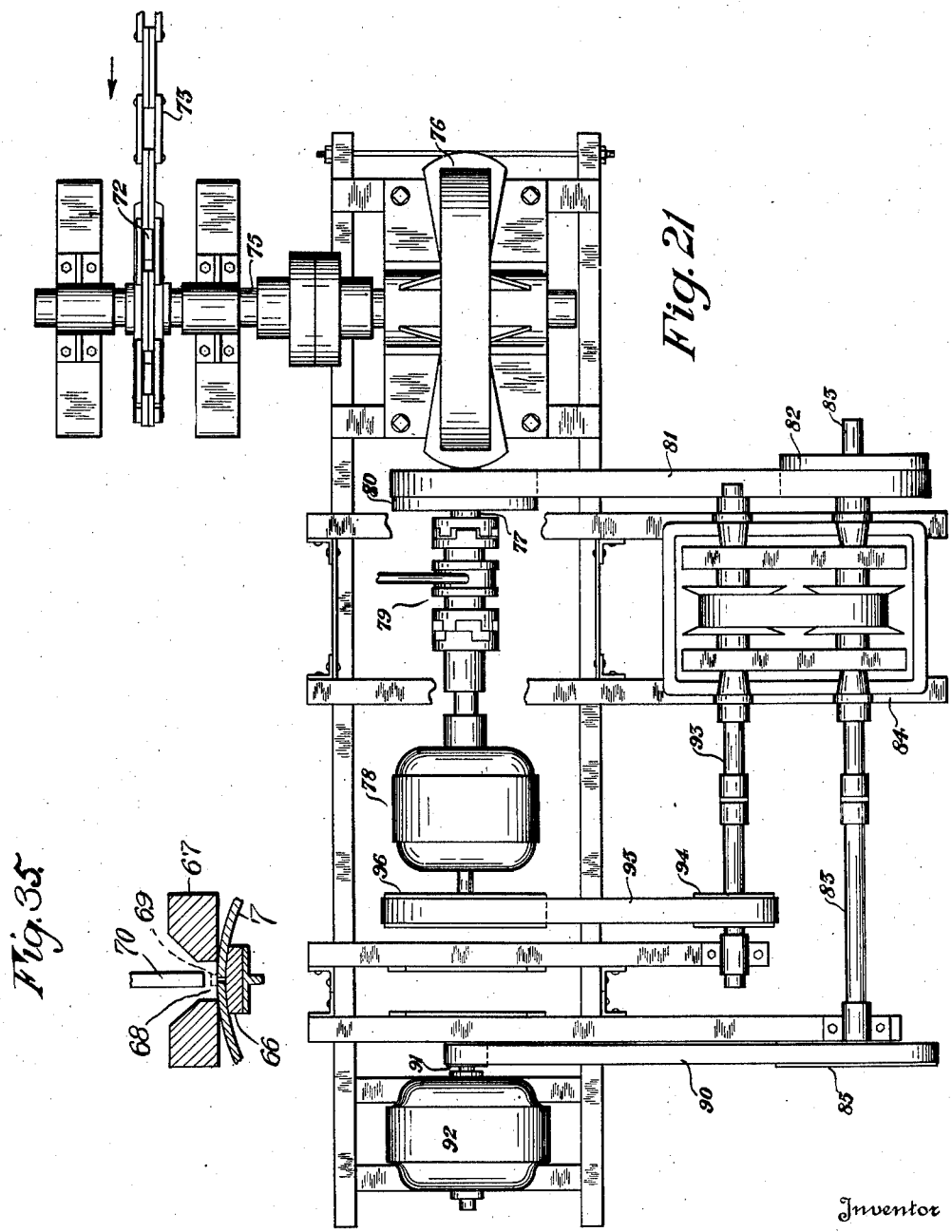

Feb. 11, 1930.  E. W. RIEMENSCHNEIDER  1,746,281
APPARATUS FOR AND METHOD OF MAKING TAPERED TUBULAR POLES
Filed July 26, 1927  9 Sheets-Sheet 8
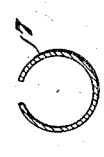
Inventor
E. W. Riemenschneider
By
Frease and Bond  Attorneys

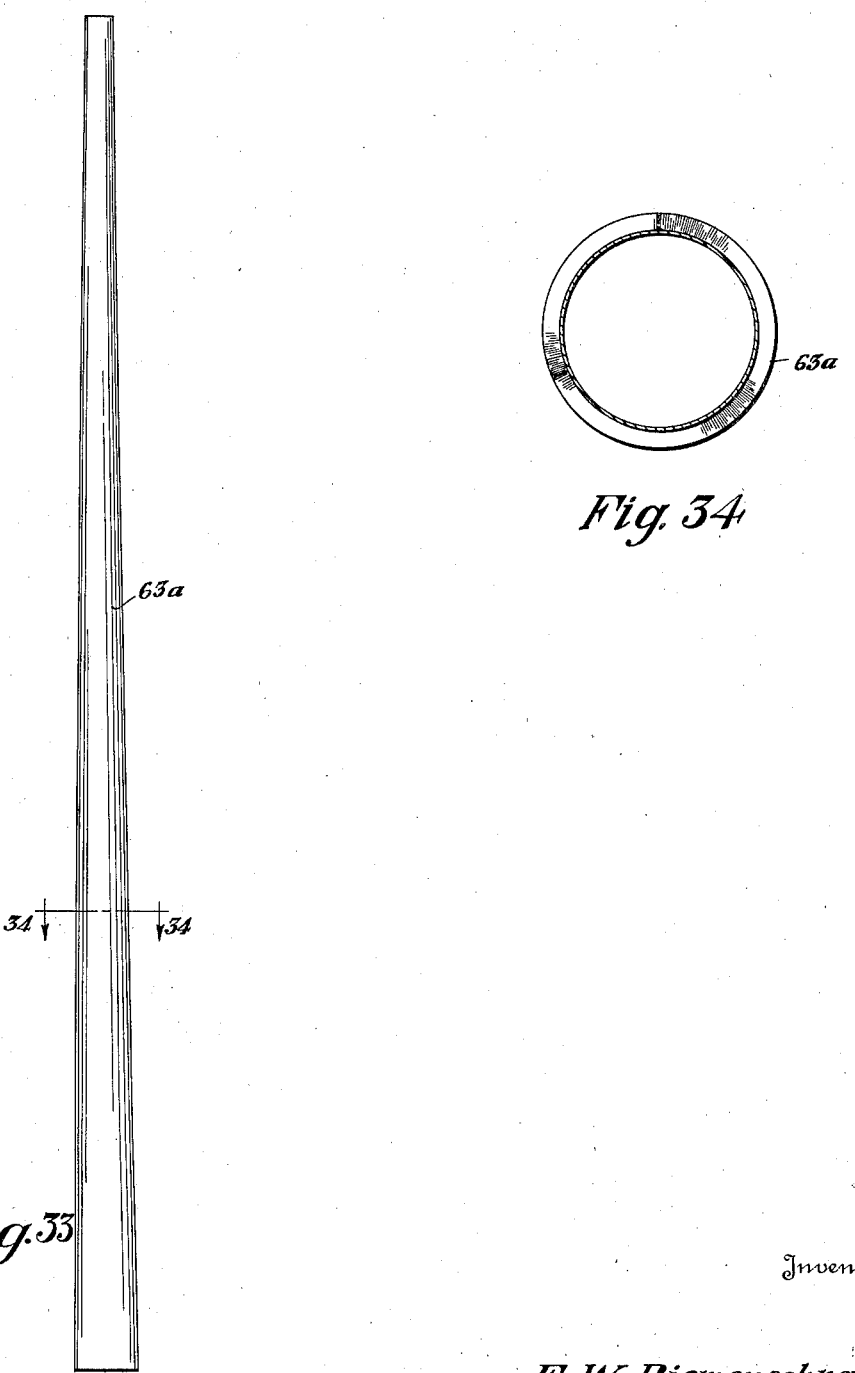

Patented Feb. 11, 1930

1,746,281

UNITED STATES PATENT OFFICE

EDMUND W. RIEMENSCHNEIDER, OF CANTON, OHIO, ASSIGNOR TO THE UNION METAL MANUFACTURING COMPANY, OF CANTON, OHIO, A CORPORATION OF OHIO

APPARATUS FOR AND METHOD OF MAKING TAPERED TUBULAR POLES

Application filed July 26, 1927. Serial No. 208,491.

The invention relates to the formation of tubular sheet metal poles and more particularly to tapered poles adapted for use as telephone, telegraph, transmission and trolley poles, and to an apparatus for forming such poles; and is an improvement and also a continuation of certain common subject matter disclosed but not claimed in my co-pending application Serial No. 132,369, filed August 30, 1926.

In the past it has never been possible to form tapered sheet metal poles for such purposes, as it has been found that in order to provide the required height it was necessary to form the pole of such extremely large diameter as to make it impractical for such use.

Under the old method of forming tapered sheet metal columns, it was only possible to form such columns of light gauge metal and thus unless a column of any great height were formed of extremely large diameter, it could not resist the transverse strains to which telegraph, telephone, transmission or trolley poles are subjected.

The object of the improvement is to provide for the manufacture of a tapered, tubular pole capable of use for carrying telegraph, telephone, transmission or trolley wires, and of a height and diameter substantially the same as the wooden poles which are at present in common use for such purposes.

The height of the improved pole may be twenty or more times the base diameter thereof, while at the same time the pole has sufficient strength to resist the transverse strains to which such poles are subjected.

The above and other objects may be attained by providing a machine comprising initial forming rolls and an initial forming mechanism including a funnel having a tapered core therein, and a final forming mechanism including a plurality of expansible die sections having a tubular tapered converging shape, of greater taper than the pole to be formed, through which a sheet metal blank is passed, the edges of the blank abutting as it emerges from the forming dies, at which point the edges are preferably welded together, producing a one-piece tapered sheet metal pole.

If desired, this pole may be placed upon a tapered mandrel and cold rolled for the purpose of removing any irregularities in the shape and also for strengthening the pole.

Figure 6:
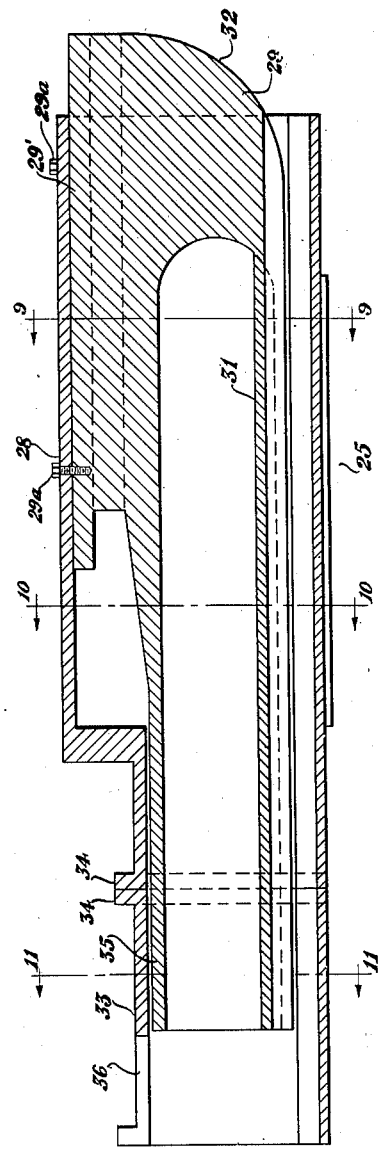
Figure 12:
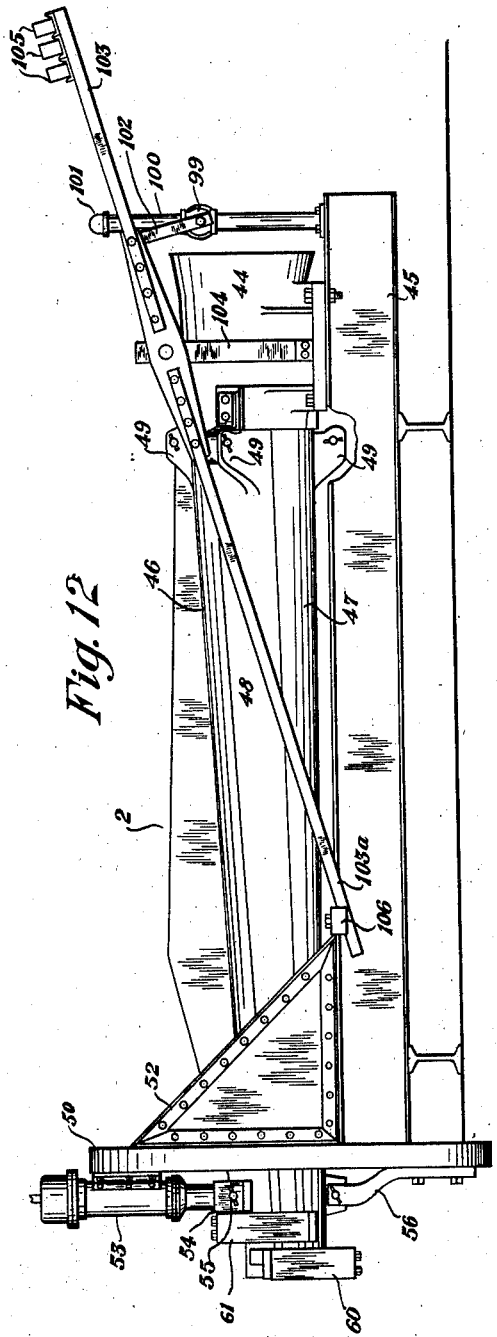
Figure 13:
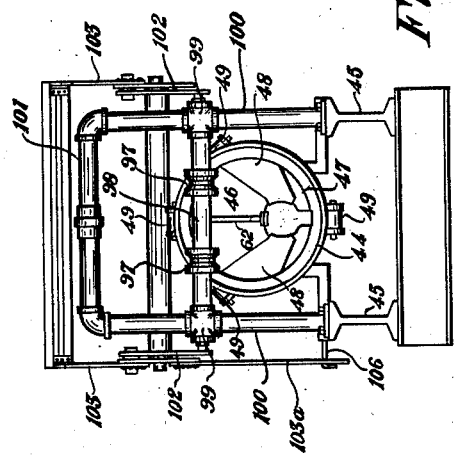
Figure 14:
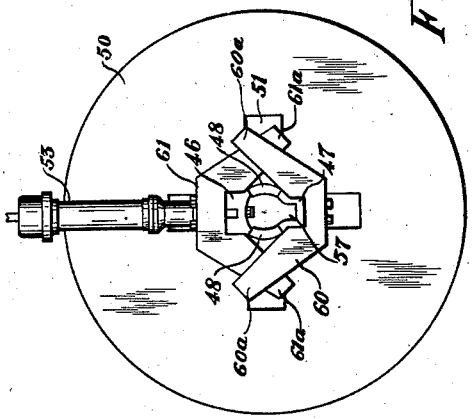

An embodiment of the invention is illustrated in the accompanying drawings, in which Figure 1 is a plan view of the complete apparatus for producing the tapered tubular poles;

Fig. 2, a side elevation of the same;

Fig. 3, a plan view of the initial forming rolls and funnel;

Fig. 4, a side elevation of the same;

Fig. 5, a section taken substantially on the line 5—5, Fig. 3;

Fig. 6, an enlarged section of the funnel and core on the line 6—6, Fig. 3;

Fig. 7, an enlarged section on the line 7—7, Fig. 3, showing a front elevation of the initial forming rolls;

Fig. 8, an enlarged front end view of the larger end of the initial forming funnel and core;

Fig. 9, a transverse section through the funnel and core taken on the line 9—9, Fig. 6;

Fig. 10, a similar section on the line 10—10, Fig. 6;

Fig. 11, a similar section on the line 11—11, Fig. 6;

Fig. 12, a side elevation of the adjustable forming die which produces the final forming of the pole;

Fig. 13, an end view of the entrance end of said forming die;

Fig. 14, an end view of the exit end thereof;

Fig. 15, a longitudinal sectional view through the forming die showing the sheet blank passing therethrough for the final formation;

Fig. 16, a section on the line 16—16, Fig. 15;

Fig. 17, a section on the line 17—17, Fig. 15;

Fig. 18, an enlarged fragmentary elevation of the guide at the exit end of the forming die;

Fig. 19, a section on the line 19—19, Fig. 18;

Fig. 20, a section on the line 20—20, Fig. 19;

Fig. 21, a plan view of the drive mechanism;

Fig. 22, a plan view of the tapered sheet blank from which a pole is formed;

Fig. 23, a plan view showing the form the blank assumes as it passes through the exit end of the initial forming funnel, the form to which the blank springs after emerging from the funnel being shown in dotted lines;

Fig. 24, a transverse section through the sheet blank before it enters the initial forming mechanism;

Fig. 25, a similar view showing the curvature the blank assumes as it passes through the initial forming rolls;

Fig. 26, a similar section showing the curvature of the blank shortly after entering the initial forming funnel;

Fig. 27, a similar section showing the curvature of the blank when part way through the initial forming funnel;

Fig. 28, a section showing the form the blank assumes as it passes through the exit end of the initial forming funnel, the form to which the blank springs after emerging from the funnel being shown in dotted lines;

Fig. 29, a transverse section through the blank as it enters the final forming die;

Fig. 30, a similar view showing the blank part way through the final forming die;

Fig. 31, a section through the blank at the exit end of the final forming die;

Fig. 32, a transverse section through the finished welded pole as it emerges from the final forming die;

Fig. 33, an elevation of the completed tubular pole;

Fig. 34, a section on the line 34—34, Fig. 33; and

Fig. 35, a section on the line 37—37, Fig. 19.

Similar numerals refer to similar parts throughout the drawings.

The apparatus comprises generally the initial forming mechanism indicated at 1 and the final or tube forming mechanism indicated generally at 2, and including suitable means, such as the draw bench 3, for pulling the blanks therethrough.

As shown in Figs. 1 and 2, this initial and final forming mechanism may be located in alignment for continuous passage of the blanks through the same, although it should be understood that because of the differences in possible speeds of these two mechanisms, the blanks may be first initially formed or bent in the initial forming mechanism and afterwards passed through the final forming mechanism.

Because of the fact that the blanks may be passed through the initial forming mechanism at a speed much greater than is possible in the final forming operation, it may be desirable to initially form or bend the blanks in one initial forming apparatus, which will supply a sufficient number of initially formed blanks to accommodate several final forming units.

The initial forming or bending mechanism is supported in the side frames 4, in which are journaled the upper and lower bending or initial forming rolls 5 and 6 respectively.

The bearings 5ᵃ of the upper roll, may be slidably mounted in the vertical slots 5ᵇ, in the housings, and adapted to be adjusted toward or from the lower roll, as by the screws 5ᶜ.

The upper roll is preferably in the form of an ellipsoid and the lower roll is concaved to conform to the contour of the upper roll; and these rolls may be used to feed the blank into the initial forming funnel, if desired.

For the purpose of more positively feeding and guiding a sheet blank 7 through the bending rolls into the forming funnel, a pair of feed rolls 8 and 8ᵃ may be located ahead of the bending rolls, and a similar pair of feed rolls 9 and 9ᵃ located beyond the bending rolls.

The upper feed rolls of each pair may be journaled in bearings, vertically adjustable in the slots 10 of the housing, and adapted to be adjusted toward and from the lower rolls, as by the screws 11.

A gear 12 is fixed upon the shaft of the feed roll 8 and meshes with a similar gear 13 upon the shaft of the feed roll 8ᵃ. The gear 13 also meshes with a pinion 14, upon a countershaft 15, provided at its other end with a gear 16 which meshes with a pinion 17 upon the drive shaft 18.

A gear 19 may be fixed upon the drive shaft to mesh with the pinion 20 upon the shaft of the motor 21 which is arranged to drive the initial forming mechanism.

Gears 22, meshing with each other, are provided upon the shafts of the feed rolls 9 and 9ᵃ, and for the purpose of driving these feed rolls in unison with the feed rolls 8 and 8ᵃ the shafts of the rolls 8ᵃ and 9ᵃ may have fixed thereon the sprocket wheels 23 operatively connected as by the chain 24.

Beyond the bending rolls and feed rolls, above described, is located the initial forming funnel 25, which may be supported upon the transverse I-beams 26 mounted upon the base rails 27 of the side frames.

Throughout the greater portion of its length, this funnel is flat at its upper side, as indicated at 28, and mounted within the funnel is a core 29, conforming to the inner contour of the funnel and being spaced slightly therefrom to permit the sheet blank emerging from the bending rolls to pass through the funnel and around the core.

This core is provided at its upper side with the flat head portion 29′ arranged to be connected, as by screws 29ᵃ, to the flat upper portion 28 of the funnel, whereby the core is thus suspended from the upper side of the funnel.

For the purpose of reducing the weight of the core, the same may be hollow, as shown at 31. The larger end of the core, which is disposed toward the feed rollers 9 and 9ª, is rounded as shown at 32, in order to permit the partially formed blank to easily enter the funnel.

This funnel and core are so shaped that as the sheet blank passes through the same, each portion of the blank passes in a straight line from the larger end of the funnel toward the smaller end thereof, thus preventing any stretching or drawing of the sheet metal and merely bending or forming the same to be cylindrically curved, although because the edges of the blank are tapered, and because of the fact that the tapered edges are not brought into abutment when passing the same through the funnel, the cylinder is formed only as far as the sheet metal reaches.

At the exit end of the funnel is located the cylindrical, tubular neck 33, which may be connected to the funnel as by the annular flanges 34.

The core 29 is provided with the cylindrical extension 35 which is located within the cylindrical neck 33 and may extend to a point adjacent the slot 36 in the upper side of the cylindrical neck provided to receive the feed roll 37 which co-operates with the smaller, lower feed roll 38 to withdraw the partially formed cylindric product from the funnel.

The feed rolls 37 and 38 may be geared together, as by the gears 39 and 40 mounted upon the shafts of said rolls respectively, and these rolls may be driven indirectly by the motor 21 through a chain 41 passing over the sprockets 42 and 43 upon the shafts of the rolls 37 and 9 respectively.

As illustrated in Figs. 1 and 2, the partially formed cylindric product may pass continuously from the initial forming mechanism just described to the final forming mechanism shown generally at 2.

This final tube forming mechanism includes the bell 44 which may be fixed upon the bed 45 in alignment with the cylindrical neck of the funnel and may be flared toward the initial bending mechanism, as illustrated, to assist in the entrance of the partially formed cylindric product.

Upper, lower and side forming die sections 46, 47 and 48 respectively are hingedly connected to the hollow bell 44 as shown at 49; whence they extend forward a substantial distance to their free ends, which are adapted to open apart or close together upon their hinged ends.

These die sections when in the closed position as shown in Figs. 12 to 14 inclusive, form a hollow tapered tubular expansible die through which the partially formed sheet blank is pulled, emerging from the smaller end of the die in the form of a tapered tubular pole.

As illustrated in the drawings, the inner faces of the die sections 46, 47 and 48 may be and preferably are curved arcuately, with the curvature of the exit ends corresponding to about the intermediate curvature of a tapered tube; but neither such a curvature nor any curvature at all, is essential for the proper operation of the die sections, as an extended circumferential contact is not necessary to complete the tapered formation of the partially formed cylindric blank.

A face plate 50 surrounds the hinged forming die sections near their free ends, and is provided with the central opening 51 of suitable diameter to permit the die sections to open or expand to accommodate the maximum base diameter of the pole to be formed therein.

The face plate may be supported independently of the forming die sections, as by angle brackets 52 mounted on the bed 45, and may carry a fluid cylinder 53 having a piston 54 pivotally connected to the free or exit end of the upper forming die section 46, as indicated at 55.

The free or exit end of the lower forming die section 47 may be supported in a fixed and substantially horizontal position as by a bracket 56 secured to the face plate 50, and this lower die section may be provided with a groove 57 to accommodate the cable 58 and clamp 59 by means of which the sheet blanks may be pulled through the die.

So as to equalize the pressure exerted by the die on the pole being formed therein, the expansible die sections 46, 47 and 48 are correlated or interdependently coordinated, as follows:

A V-shaped guide bracket 60 is preferably secured to the free end of the exit end of the lower die section 47, and is provided with guide arms 60ª extending upward and outward at an angle of about 45° from the vertical, substantially corresponding to the movement of the exit ends of the side die sections 48 when opening and closing by swinging on their hinged ends; and the lower edges of the exit ends of the side die sections 48 are adapted to bear and slide upon these arms for equalizing their movements.

An inverted V-guide bracket 61 provided with guide arms 61ª extending downward and outward at a similar angle of about 45° from the vertical, is preferably secured to the exit end of the upper forming die section 46 adjacent to the lower guide bracket 60, so as to co-operate therewith; and the guide arms of which upper bracket are arranged to bear and slide upon the upper edges of the exit ends of the side die sections 48 to equalize their movements, when the same are opened by the action of a tapered tube passing through the exit end of the die.

The upper die section 46 is provided with a depending rib 62 which keeps the edges of the partially formed tube from overlapping. This rib registers with a tapered rib 63 located at the free end portion of the upper die section and having the upwardly and forwardly inclined flanges 64 at its lower edge.

This tapered rib with inclined flanges at its lower edge guides the edges of the sheet blank as the same emerges from the forming die, bringing the edges into aligned abutment at this point.

Any suitable welding apparatus may be applied to the abutting edge portions of the tapered tube, as it emerges from the forming die, butt-welding the edges of the sheet together and forming a tapered tubular pole as shown at 65.

Such welding means may include an anvil plate 66 extending forward from the flanges 64 on the lower end of the tapered rib 63, upon which the abutting or adjacent edges of the formed tube may rest, and a pair of electrode plates 67 inclined toward each other and spaced apart to form a trough with a longitudinal slot 68 in the bottom thereof, into which slot may be fed a wire 69 which is adapted to be fused by an arc welding electrode 70 to join the adjacent or abutting edges of the tapered tube together, as it moves from the exit end of the die.

The taper of the forming die sections 46, 47 and 48 is considerably greater than the taper of the pole formed therein and the smaller end of the die is always maintained at a diameter corresponding to the portion of the pole passing through the same, whereby the edges of the sheet abut only at the point where the sheet blank emerges from the forming die.

Sufficient pressure is maintained in the fluid cylinder 53 acting directly upon the upper die section 46, and through the guide bracket 61 upon the side die sections 48, to hold the forming die sections in a yielding pressing contact with the tapered tube as it is finally formed at this point, while the increasing diameter of the pole as it passes out of the forming die with its tapered edges in aligned abutment, causes the upper and side die sections to uniformly open or expand upward and outward from the lower die section against the pressure of the fluid cylinder.

The pulling apparatus may be in the form of a draw bench including the sprocket wheels 71 and 72 over which the endless chain 73 is located, the hook 74 upon the end of the cable 58 being adapted to be engaged in said chain which is driven in the direction of the arrow shown in Fig. 2 for drawing the sheet blank through the forming die.

The sprocket wheel 72 is mounted upon the shaft 75 of the worm gear reduction shown generally at 76.

The shaft 77 connects the worm gear reduction 76 with another gear reduction shown at 78, a clutch 79 being interposed between the gear reduction 78 and the pulley 80 upon said shaft.

This pulley is connected by a belt 81 with a pulley 82 upon a shaft 83 operatively connected with a Reeves drive shown generally at 84, which includes a pair of pulleys adjustable as to diameter for transmitting different speeds.

The shaft 83 extends through the other side of the Reeves drive and is provided with a pulley 85 connected, by a belt 90, with the pulley 91 upon the shaft of the motor 92.

The shaft 93, from the Reeves drive, is provided with a pulley 94 connected, by a belt 95, with the pulley 96 upon the shaft of the gear reduction 78.

The sprocket chain 73 may thus be driven at fast or slow speed as desired by operating the clutch 79. In the position shown in Fig. 21, the drive will be from the motor through the shaft 83 to the shaft 77 and then through the gear reduction 76 to the sprocket wheel 72.

If it is desired to drive at a slower speed, the clutch will be thrown into the position in which the drive will be from the motor to the shaft 83, then through the Reeves drive to the gear reduction 78, and then through the worm gear reduction 76 to the sprocket wheel.

It is sometimes desirable to guide a partly formed cylindric tube into the bell 44 of the final forming mechanism in such a manner as will hold the edges of the tube in the same horizontal plane and prevent a twisting of the curved blank.

For this purpose, a pair of grooved guide wheels 97 are journaled for sliding laterally upon a shaft 98, which shaft extends between bearings 99 slidably mounted upon upright bars 100 of a guide frame 101, so that the guide wheels 97 may be readily adjusted sideways to engage the edges of the curved blank, and may be together adjusted vertically so as to bear upon and hold said edges in the same horizontal plane, thus forming yielding means for centering and guiding the cylindrically curved blank into the final forming die.

Connecting links 102 may extend upward from the bearings 99 to a connection with long levers 103 pivotally mounted on standards 104 on each side of the guide frame, on the free end of which levers suitable weights as 105 may be carried for yieldingly pressing the guide wheels 97 downward upon the edges of the curved blank during its progress into the final forming mechanism.

The other end of the lever 103 is extended to form a handle 103a by which the guide wheels 97 may be raised and lowered by manual means; and when the same are not in use, they may be held upward to clear the path of a curved blank and may be locked in such position by engaging the handle 103ᵃ of a lever under an L-stop bracket 106.

With the described apparatus, tapered tubular poles of even extremely heavy gauge metal may be quickly formed of any desired length governed only by the length of sheet blank which is used.

It will be understood that a tapered tube may be formed with a truly circular section throughout its length, as illustrated in Figs. 31, 32 and 34 of the drawings, and also that it is preferred to form the tube with straight sides tapering uniformly from the axis of the tube, and such is the preferred formation when the product is a plain tapered tube, as illustrated in Fig. 33; but the invention is not limited to the formation of such a tapered tube, for it is evident the same means may be employed to form a tube having an oval or otherwise irregular cross section, and that it need not be formed truly upon a straight axis, especially when the tapered tube is to be subsequently cold rolled or fluted.

The finished welded pole as illustrated at 63ᵃ in Figs. 33 and 34 may thus have a length of twenty or more times the base diameter, the pole produced having sufficient inherent strength to resist the transverse strains to which telegraph, telephone, transmission and trolley poles are subjected.

From the above it will be seen that an integral, tapered, tubular pole of considerable length and relatively small diameter may be made of sheet metal, such pole being capable of withstanding the transverse strains of the wires when used as above described.

I claim:

1. Apparatus for forming tapered tubular sheet metal poles, including initial bending rolls, a forming funnel, a tapered core in the funnel, final forming dies, and laterally and vertically movable means for guiding a partly formed pole into the forming dies.

2. Apparatus for forming tapered tubular sheet metal poles, including initial bending rolls, a forming funnel, a tapered core in the funnel, final forming dies, and laterally and vertically movable guide rollers for centering and guiding a partly formed pole into the forming dies.

3. Apparatus for forming tapered tubular sheet metal poles, including an expansible tubular forming die having a plurality of sections, and yielding means for centering and guiding a sheet metal blank into the forming die.

4. Apparatus for forming tapered tubular sheet metal poles, including initial bending rolls, a forming funnel, a tapered core in the funnel, and a final tapered forming die having a plurality of sections, the taper of the forming die sections being greater than the taper of the pole formed therein.

5. Apparatus for forming tapered tubular sheet metal poles, including an expansible tapered tubular forming die having a plurality of sections, the taper of the forming die being greater than the taper of the pole formed therein.

6. Apparatus for forming tapered tubular sheet metal poles, including an expansible tapered tubular forming die having a plurality of sections, and yielding means resisting an expansion of the die, the taper of the forming die sections being greater than the taper of the pole formed therein.

7. Apparatus for forming tapered tubular sheet metal poles, including initial bending rolls, a forming funnel, a tapered core in the funnel, and a final forming expansible die having a plurality of sections correlated for equalizing the pressure exerted by the die on the pole being formed therein.

8. Apparatus for forming tapered tubular sheet metal poles, including initial bending rolls, a forming funnel, a tapered core in the funnel, and a final forming correlated expansible die having a plurality of sections.

9. Apparatus for forming tapered tubular sheet metal poles, including an expansible tubular forming die having a plurality of sections correlated for equalizing the pressure exerted by the die on the pole being formed therein, and yielding means resisting an expansion of the die.

10. Apparatus for forming tapered tubular sheet metal poles, including initial bending rolls, a forming funnel, a tapered core in the funnel, and a final forming expansible tubular die having a plurality of sections expanded by the action of a tapered tube being formed therein and passed therethrough.

11. Apparatus for forming tapered tubular sheet metal poles, including initial bending rolls, a forming funnel, a tapered core in the funnel, a final forming expansible tubular die having a plurality of sections expanded by the action of a tapered tube being formed therein, and passed therethrough, and yielding means resisting an expansion of the die.

12. Apparatus for forming tapered tubular sheet metal poles, including initial bending rolls, a forming funnel, a tapered core in the funnel, a final forming expansible die having a plurality of sections and means carried by the die for bringing the edges of a sheet blank being formed therein into aligned abutment.

13. Apparatus for forming tapered tubular sheet metal poles, including an expansible tubular forming die having a plurality of sections, and means carried by the die for bringing the edges of a sheet metal blank being formed therein into aligned abutment.

14. Apparatus for forming tapered tubular sheet metal poles, including initial bending rolls, a forming funnel, a tapered core in the funnel, a final forming expansible die including a plurality of sections, and means carried by the die for welding together the edges of a formed pole.

15. Apparatus for forming tapered tubular sheet metal poles, including an expansible tubular forming die including a plurality of sections, yielding means resisting an expansion of the die, and means carried by the die for welding together the edges of a formed pole.

16. The method of forming a tapered tubular sheet metal pole which includes cylindrically curving a tapered sheet metal blank, and then bringing the edges of the cylindrically curved tapered blank into aligned abutment.

17. The method of making a tapered tubular sheet metal pole which includes cylindrically curving a tapered sheet metal blank, then bringing the edges of the cylindrically curved tapered blank into aligned abutment, and then welding together the abutting edges.

18. Apparatus for forming tapered tubular sheet metal poles, including initial bending rolls, a cylinder forming funnel, a tapered core in the funnel, and a tubular expansible die including a plurality of sections for completing the formation of the tapered pole.

19. Apparatus for forming tapered tubular sheet metal poles, including initial bending rolls, a cylinder forming funnel, a tapered core in the funnel, a tubular expansible die including a plurality of sections, and yielding means resisting an expansion of the die for completing the formation of the tapered pole.

20. Apparatus for forming tapered tubular sheet metal poles, including initial bending rolls, a cylinder forming funnel, a tapered core in the funnel, a final forming expansible die including a plurality of sections, and means applied to one end of a sheet blank for passing the same through the apparatus.

21. Apparatus for forming tapered tubular sheet metal poles, including initial bending rolls, a cylinder forming funnel, a tapered core in the funnel, a tubular, expansible die including a plurality of sections, and means for welding together the edges of a formed pole for completing the formation of the tapered pole.

22. Apparatus for forming tapered tubular sheet metal poles, including initial bending rolls, a cylinder forming funnel, a tapered core in the funnel, and means applied to one end of a sheet blank for passing the same through the rolls and funnel.

23. Apparatus for forming tapered tubular sheet metal poles, including a cylinder forming funnel, a tapered core in the funnel, and a tubular expansible die including a plurality of sections for completing the formation of the tapered pole.

24. Apparatus for forming tapered tubular sheet metal poles, including a cylinder forming funnel, a tapered core in the funnel, a final forming expansible die including a plurality of sections, and means applied to one end of a sheet blank for passing the same through the funnel and die.

25. Apparatus for forming tapered tubular sheet metal poles, including an expansible tubular tube forming die having a plurality of sections, and yielding means resisting an expansion of the die.

26. Apparatus for forming tapered tubular sheet metal poles, including an expansible tubular tube forming die having a plurality of sections, yielding means resisting an expansion of the die, and means for welding the edges of a formed tube.

27. Apparatus for forming tapered tubular sheet metal poles, including an expansible tubular tube forming die having a plurality of sections, yielding means resisting an expansion of the die, and means for passing a sheet blank through the die.

28. Apparatus for forming tapered tubular sheet metal poles, including an expansible tubular tube forming die having a plurality of sections, yielding means resisting an expansion of the die, means for welding the edge of a formed tube, and means for passing a sheet blank through the die.

29. Apparatus for forming tapered tubular sheet metal poles, including a bell, a tapered tubular tube forming die having a plurality of sections hinged to the small end of the bell, and yielding means pressing the free ends of the die sections together.

30. Apparatus for forming tapered tubular sheet metal poles, including an expansible tapered tube forming die having a plurality of sections, and yielding means resisting an expansion of the die.

In testimony that I claim the above, I have hereunto subscribed my name.

EDMUND W. RIEMENSCHNEIDER.